United States Patent [19]

Stigebrandt

[11] 4,242,204
[45] Dec. 30, 1980

[54] APPARATUS FOR SEPARATION OF MATERIAL SUSPENDED IN LIQUIDS

[76] Inventor: Åke Stigebrandt, Lillbräckegatan 15, Uddevalla, Sweden, S-451 00

[21] Appl. No.: 26,797

[22] Filed: Apr. 3, 1979

[51] Int. Cl.³ .............................................. B01D 33/06
[52] U.S. Cl. ................................ 210/326; 210/333.01
[58] Field of Search ............... 210/326, 333 R, 333 A, 210/334, 393

[56] References Cited

U.S. PATENT DOCUMENTS

| 2,602,549 | 7/1952 | Peterson | 210/326 X |
| 4,102,791 | 7/1978 | Otte | 210/326 |

Primary Examiner—John Adee
Attorney, Agent, or Firm—Cushman, Darby & Cushman

[57] ABSTRACT

A rotary drum vacuum filter separator for treating suspensions such as waste water from households or industry. The separator comprises a pair of cooperating counter-rotating drums, of which at least one is a filter drum, in which stationary shield walls define sections of different air pressure.

8 Claims, 6 Drawing Figures

ABOUT PATENT 4,242,204

APPARATUS FOR SEPARATION OF MATERIAL SUSPENDED IN LIQUIDS

The present invention relates to an apparatus for separation of material suspended in liquids.

Purification of waste water is necessary to protect our environment. One particular purification process relates to the treatment of suspension, e.g. separation of cellulose fibres from the waste water of a paper mill or separation of solid material from the waste water of households. Various arrangements for treatment of suspension are used. Particularly, various rotating drum filters partially immersed in the suspension to be treated have been suggested, e.g. as disclosed in the German Pat. specification No. 883,594. The efficiency of the prior art drum filters has been limited. Further, those operating with vacuum to increase the efficiency are provided with a complicated rotating valve arrangement to control the pressure in the various section of the drum.

The object of the present invention is to provide an improved rotary drum filter which is more efficient and less complicated than the prior art filters. This is achieved by an apparatus having the features stated in the claims.

Below the invention will be described with reference to the drawings, in which.

Figure 1:
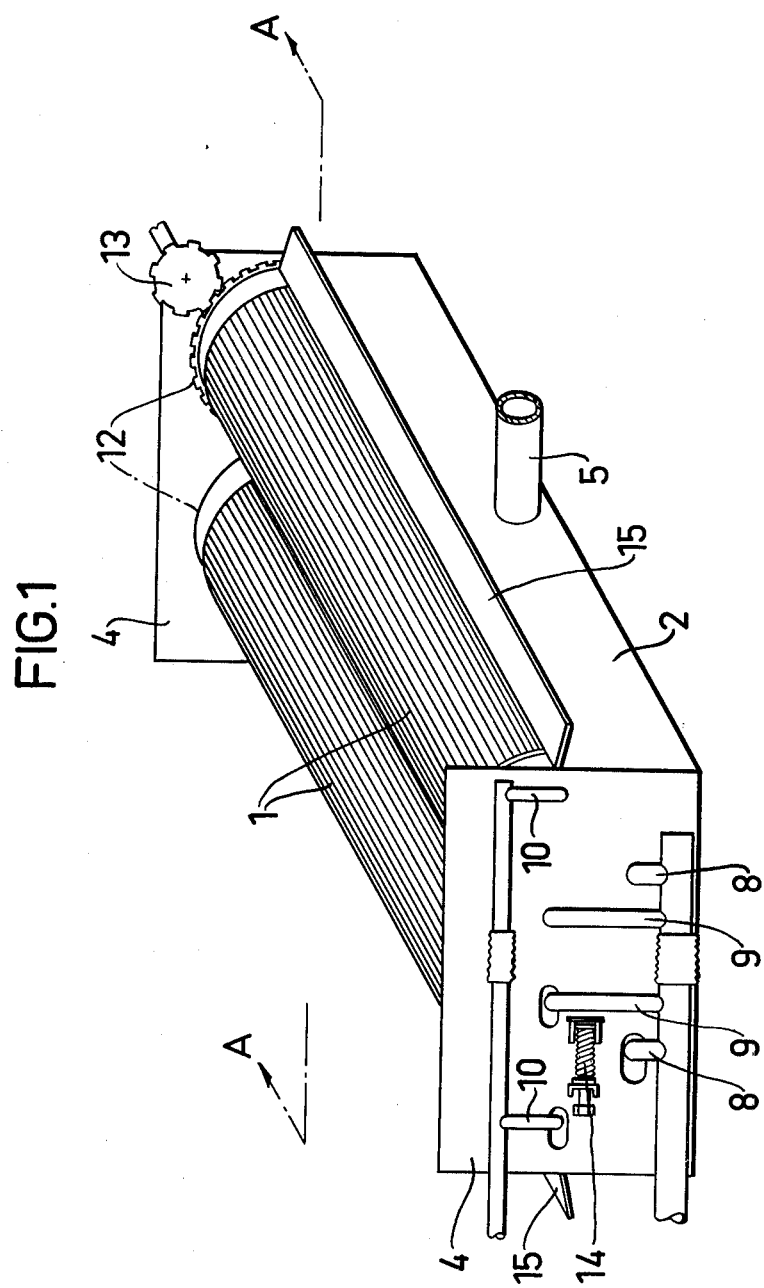
FIG. 1 shows an embodiment of the invention.

The embodiment disclosed in FIG. 1 comprises two cylindrical drums 1 rotating in a vessel 2. The drums 1 have the equal diameters, but in other embodiments the diameters may be unequal. At least one of the drums is a perforated filter drum having a screen cloth. Each drum is supported by and journalled in two carrier means 3, which are mounted in end walls 4 of the vessel 2. In case only one of the drums is a filter drum the other drum may be supported by the end walls of the vessel by means of shaft pins in the center line of the drum. The suspension to be treated is fed into the vessel 2 through an inlet pipe 5, and the level in the vessel is controlled by a level transducer 6. Alternatively the level may be controlled by a treshhold outlet (not shown). The cavity in each filter drum is divided into stationary sections by a shield arrangement 7, which is rigidly connected to the carrier means 3. The inner cylindrical wall of the filter drum forms a wall in each active section. There is different pressure in the various sections due to the fact that one, two or more sections in the filter drum cavity are connected with a vacuum system through separate pipes 8 or 9 or through apertures in a shield wall or through pipes connecting the various sub-pressure sections. At least one section in each filter drum cavity is connected to a compressed air system through a pipe 10. At least one section has the same pressure as the surrounding atmosphere, and such sections may be drained into sub-pressure sections through apertures 11 in a shield wall or through draining pipe between the sections or through a small gap between the shield wall and the inner cylindrical wall of the drum.

In the embodiment disclosed in FIG. 1 one of the drums is mounted in a fix position on the end walls 4. This drum is provided with a gear ring 12. The drum is rotated by a gear wheel 13, the shaft of which being journalled in the end wall 4. Alternatively, the drive means may comprise a worm gear, chain driving etcetera. The drive shaft of the gear wheel 13 is coupled to an electric motor, hydraulic motor or any other suitable power source. The second drum is movably mounted with its carrier means 3 between the end walls 4 through slots, guide bars or similar means. The second drum is forced against the fix position drum by a mechanical spring means 14, a pneumatic cylinder, a hydraulic cylinder or similar device. The pressure force of the means 14 is adjustable and applied in such a manner that the contact pressure between the drums, caused by said force, is not reduced when the movable drum is pushed backwards. The movable drum is rotated by frictional forces between the two drums caused by the pressure force from the spring means 14. When the suspension to be treated includes agents reducing the friction between the drums, the movable drum may be provided with a gear ring or any other transmission means or drive means cooperating with the fix drum to secure rotation.

Sludge accumulated on the drums 1 is removed therefrom by scraping irons 15 having a small contact pressure against the drums 1.

Figure 5:
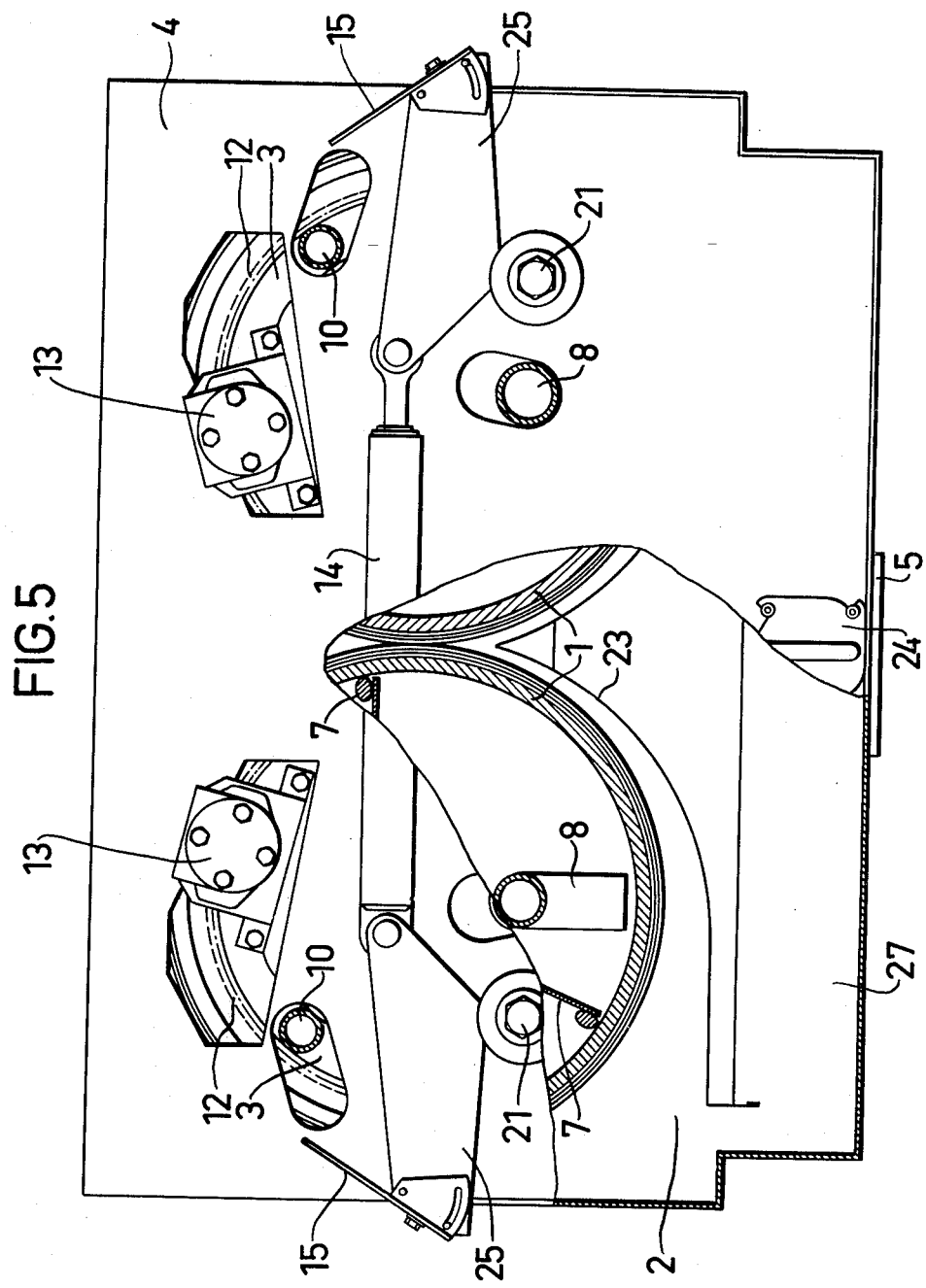
FIGS. 5 and 6 show another embodiment of the invention.
Figure 6:
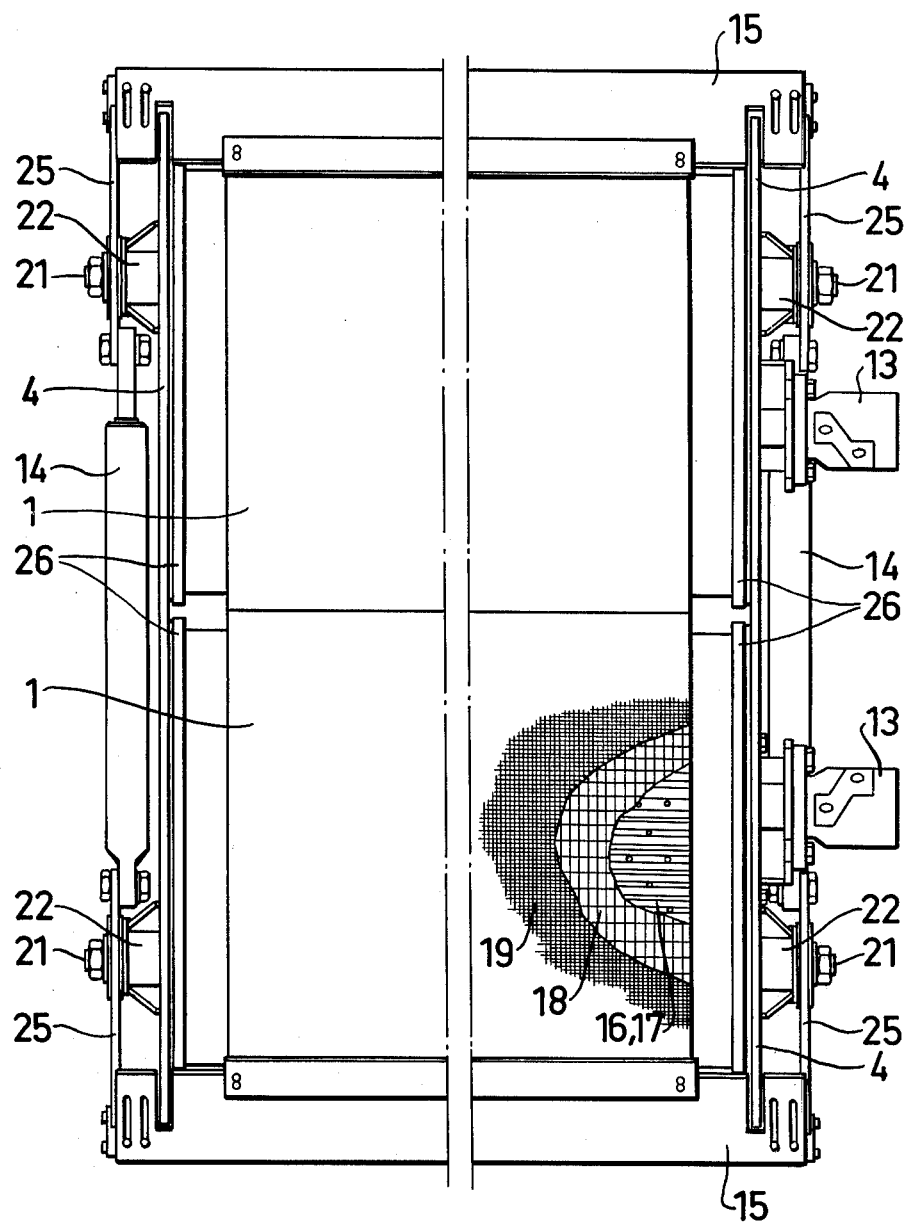

Another embodiment is disclosed in FIGS. 5 and 6. Also in this embodiment two cylindrical drums 1 rotate in a vessel 2. Both drums are perforated and provided with screen cloth. Each drum is supported by and journalled in two carrier means 3, which are mounted in the end walls 4 of the vessel 2 through eccentrical shaft pins 21 which are mounted in bushings 22 in the end walls of the vessel.

The suspension to be treated is introduced into the vessel through an inlet pipe in the lower part of the vessel, which lower part forms a scrap bin 27. Over the scrap bin there is provided a shield 23 to prevent an increase of the concentration of the suspension in the vessel and to facilitate capillary decomposition in the sludge. The scrap bin 27 is provided with a cleaning door 24. The cavity within each drum is divided into stationary sections by a shield arrangement 7 which is rigidly connected to the carrier means 3. The inner cylindrical wall of each drum formes a wall in each active section. Each section is connected to a vacuum pipe 8 or a compressed air pipe 10, respectively, in each drum. Each drum is provided with an inner gear ring 12 arranged on the casing of the drum 1. Each drum is driven by a separate motor 13 mounted on the carrier means 3. In the end walls 4 apertures for motors, pipe connections etcetera are arranged in such a manner that the drums and their carrier means may perform a limited motion with respect to the eccentrically disposed shaft pins 21. Each shaft pin 21 is provided with a connecting plate 25. On the connecting plate 25 a hydraulic cylinder 14 is mounted, which through the connecting plate 25 and the shaft pin 21 presses the drums towards each other by transferring a torque to the carrier means 3 and the drums 1. The connecting plate 25 is also a carrier means for the scraping irons 15. The drums are provided with sealing rings 26 preventing liquid to escape through the holes in the end walls 4 from the vessel 2.

Figure 4:
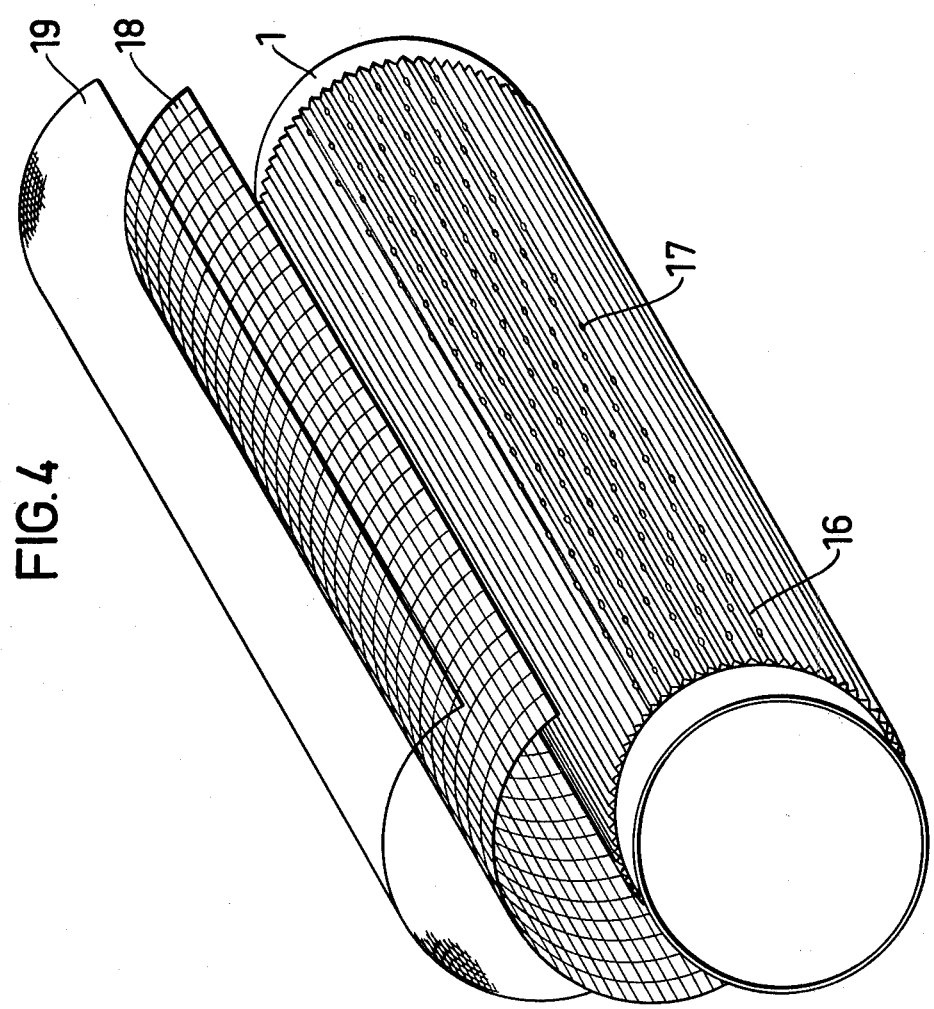
FIG. 4 shows the general design of the drum surface.

As shown in FIG. 4 there are provided a plurality of grooves 16 having a U-shaped or V-shaped cross-section, said grooves running in an axial direction along the outer surface of the drums. In the bottom of said grooves a plurality of apertures 17 are arranged. Over the grooves 16 and the outer surface of the drum there is provided a supporting screen 18 made of steel or brass or synthetic fibre etcetera. Over the supporting screen 18 there is provided a filter screen 19 preferably made of a fine mesh synthetic fibre material. Alternatively the filter screen material may be steel or brass or cloth etcetera.

Figure 2:
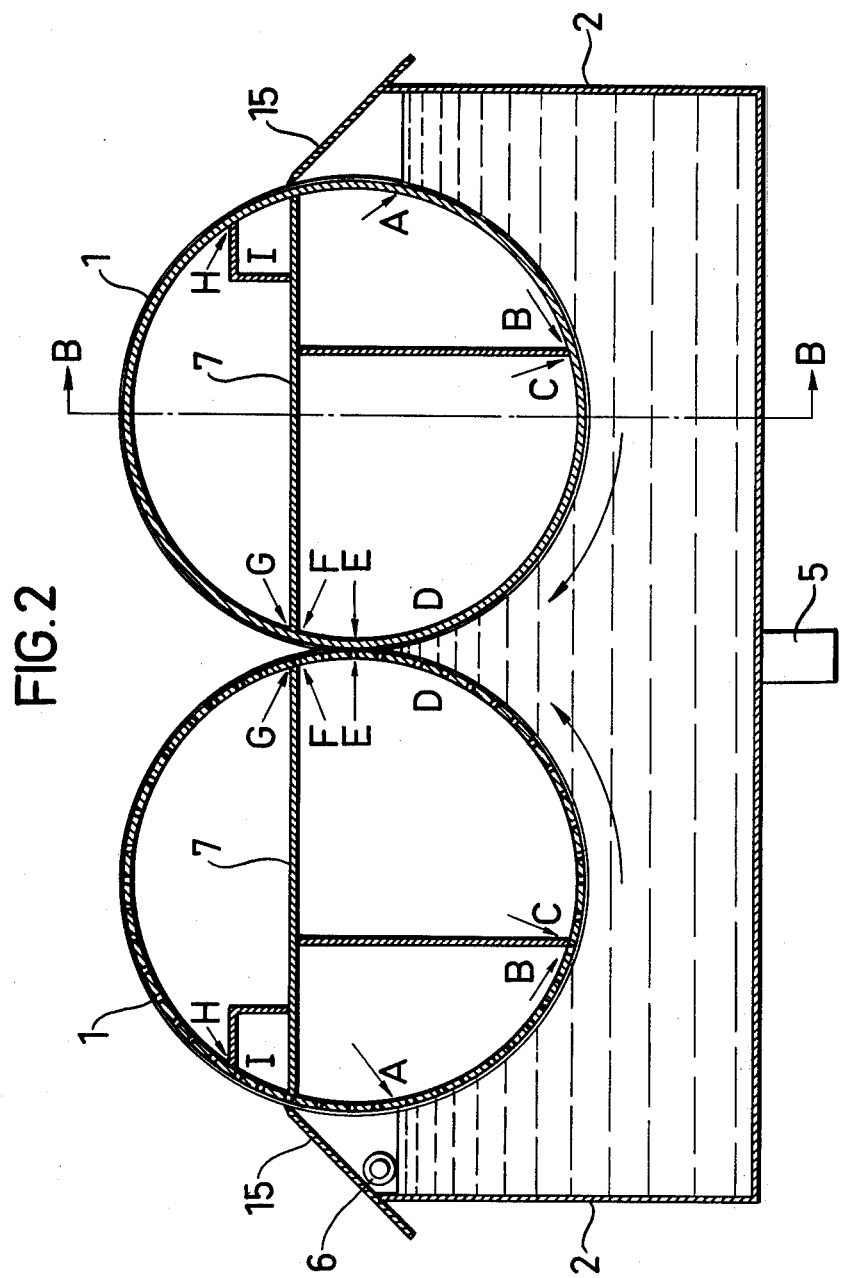
FIG. 2 is a schematical view facilitating the understanding of the operation.
Figure 3:
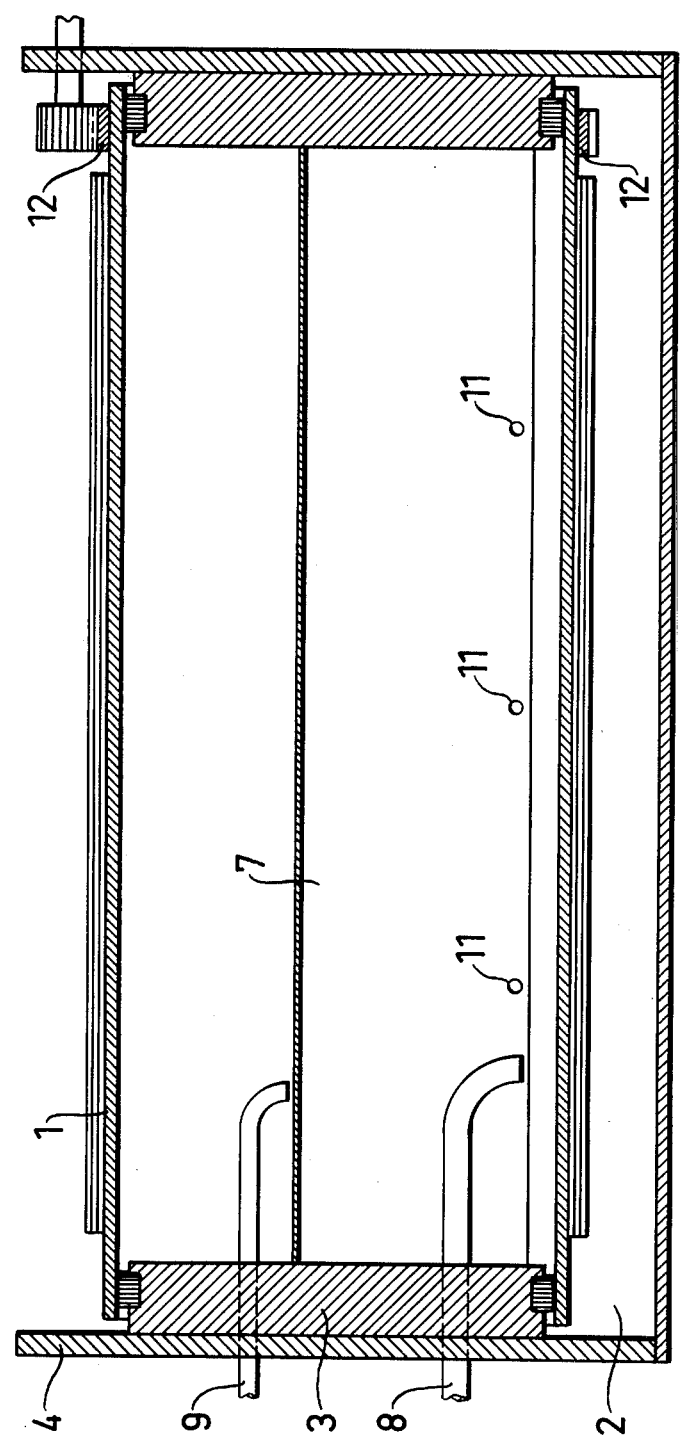
FIG. 3 is a cross-section showing in general the filter drum with carrier means, shield arrangement, pipe connections etcetera.

The operation of the apparatus is now described with reference to FIGS. 1–4. The suspension to be treated is fed into the vessel 2 through the inlet pipe 5. The level in the vessel 2 is controlled within predetermined values by the level transducer 6. In FIG. 2, the filter screen 19 is in contact with the suspension in the vessel below level A. The mesh of the filter screen is approximately equal to or smaller than the mean particle size of the suspension, which implies that the outside surface of the filter screen is covered with a layer of particles while a small amount of liquid passes through the screen. The particle coating on the outside of the screen increases the separation capability of the filter, i.e. small particles in the suspension get stuck in the particle coating. During rotation in the directions shown in FIG. 2 the thickness and density of the coating on the screen continuously increases untl a level B is reached.

Between the scrap iron 15 and the level A, the above-mentioned apertures 16 in the drum walls form a connection between the interior of the drum and the ambient air establishing ambient atmospheric pressure within the adjacent section of the drum. The increased pressure acting on the sludge deposited in a given point between the levels A and B is equal to the distance between that point and level A multiplied with the density of the suspension. The liquid entering into the drum between the levels A and B is drained into the adjacent sub-pressure section through apertures 11, FIG. 3. When a point on the drum surface has rotated to C, the pressure gradient through the sludge coating is increased due to the fact that the section C-F is evacuated through the vacuum pipe 8. The increased pressure gradient causes an increase of the liquid flow through the filter screen. Thereby the sludge coating is compressed and grows, whereby the liquid flow through the sludge coating is decreased, the decrease being substantial when a level D is reached. At that level the coatings of the two drums meet and are moved further into the nip between the two drums and further compressed by mechanical pressure. Thereby, further liquid is removed from the sludge coating. The pressure reaches a maximum at the point E. During the compression the structure of the sludge is decomposed whereby a substantial amount of porous water in the sludge particles is released and passes into the drum.

When the drum surface has reached the point G the pressure within the drum is increased to a value only slightly below ambient. The sludge coating on the filter screen adjacent section I is subjected to a high pressure air blast from the inside of section I, whereby the sludge coating is released and the filter screen is cleaned. The sludge coating is removed by the scrap irons 15.

The liquid entering each filter drum is evacuated through the vacuum pipes 8 and 9. By arranging one or both drums to be movable in a horizontal or vertical direction without reducing the contact pressure between the drums it is possible to treat sludges containing particles of varying sizes. As the contact pressure between the drums may be adjusted by means of the arrangement 14 it is possible to meet the special requirements of any suspension. Further, the dry substance contents of the separated sludge may be varied within broad limits.

As the drums are driven by one or two external power sources, the rotational velocity of the drums may be varied in accordance with the properties of the suspension to be treated. The drums may also have different rotational velocities in order to increase the decomposition of the sludge structure during the compression in the nip between the drums.

What I claim is:

1. Apparatus for separation of material suspended in liquids including a vessel into which the suspension to be treated is fed, and further including a horizontal rotary filter drum arranged in the vessel with the lower portion of said filter drum immersed in the suspension, said filter drum together with another drum forming a pair of cooperating, counter-rotating drums said drums forming a nip and the direction of rotation of said drums being such that any sludge coating on said filter drum is mechanically compressed, said filter drum being rotatably mounted on two stationary end carrier means which seal against the drum envelope surface, a stationary shield arrangement mounted on said carrier means within said filter drum, said shield arrangement sealing against the drum envelope surface and dividing the interior volume defined by the drum envelope surface and the end carrier means into sections, and means for connecting at least one of said sections to a vacuum source for reducing the air pressure in that section.

2. Apparatus according to claim 1, characterized in that the carrier means of at least one filter drum is movable in a horizontal and/or vertical direction, said drums being pressed against each other during rotation by a spring means.

3. Apparatus according to claim 2, characterized in that rotary motion drive means are connectable to one drum, the carrier end means of which being non-movable, whereas the friction between the two drums forces the other drum to counter-rotate.

4. Apparatus according to claim 1 or 2, characterized in that each drum is connectable to a rotary motion drive means through a separate transmission means.

5. Apparatus according to claim 1, including means for connecting at least one of said sections to a compressed air source so that a sludge coating my be released by a high pressure blast, the pressure in another of said sections being equal to ambient atmospheric pressure.

6. Apparatus according to claim 5, characterized in that draining apertures are arranged in a wall in the screen arrangement between said section of ambient pressure and one section of low pressure, from which liquid is drained by means of said vacuum source.

7. Apparatus according to claim 1, characterized in that a plurality of axial grooves are provided in the outer envelope surface of the drum, in which grooves there is a plurality of apertures.

8. Apparatus according to claim 7, characterized in that a filter screen is carried on a supporting screen arranged on the outer envelope surface of the drum, the mesh size of said filter screen being equal to or less than the mean size of the particles in the suspension to be treated.

* * * * *